(12) United States Patent
Scharifker et al.

(10) Patent No.: US 7,332,141 B2
(45) Date of Patent: Feb. 19, 2008

(54) PROCESS TO SEPARATE THE VANADIUM CONTAINED IN INORGANIC ACID SOLUTIONS

(75) Inventors: Benjamin Scharifker, Baruta Caracas (VE); Rossana Arenare, Baruta Caracas (VE)

(73) Assignee: Universidad Simon Bolivar, Caracas (VE)

( * ) Notice: Subject to any disclaimer, the term of this patent is extended or adjusted under 35 U.S.C. 154(b) by 54 days.

(21) Appl. No.: 11/080,702

(22) Filed: Mar. 15, 2005

(65) Prior Publication Data

US 2005/0255018 A1    Nov. 17, 2005

Related U.S. Application Data

(62) Division of application No. 10/198,652, filed on Jul. 18, 2002, now abandoned.

(30) Foreign Application Priority Data

Jul. 18, 2001    (VE) ................................. 2001-1538

(51) Int. Cl.
*C01G 31/00*    (2006.01)
(52) U.S. Cl. ........................ 423/65; 423/140; 423/367
(58) Field of Classification Search ................. 423/65, 423/140, 367
See application file for complete search history.

(56) References Cited

U.S. PATENT DOCUMENTS

| | | |
|---|---|---|
| 1,430,864 A | 10/1922 | Thews |
| 1,747,403 A | 2/1930 | Tilley |
| 4,061,711 A | 12/1977 | Morgan et al. |
| 4,243,639 A | 1/1981 | Haas et al. |
| 4,389,378 A | 6/1983 | McCorriston |
| 4,436,706 A | 3/1984 | Nacken et al. |
| 4,443,415 A | 4/1984 | Queneau et al. |
| 4,451,339 A | 5/1984 | Kranz et al. |
| 4,472,360 A | 9/1984 | McCorriston |
| 4,477,416 A | 10/1984 | Goddard |
| 4,521,382 A | 6/1985 | Kessick et al. |
| 4,524,049 A | 6/1985 | Sit |
| 4,536,374 A | 8/1985 | McCorriston |
| 4,539,186 A | 9/1985 | Schemel et al. |
| 4,548,792 A | 10/1985 | Rodriguez et al. |
| 4,788,044 A | 11/1988 | Corigliano et al. |
| 4,816,236 A | 3/1989 | Gardner |
| 4,849,189 A | 7/1989 | Jansz |
| 4,978,511 A | 12/1990 | Young |
| 5,250,158 A | 10/1993 | Kaneko et al. |
| 5,277,795 A | 1/1994 | Thornhill et al. |
| 5,876,581 A | 3/1999 | Itaya et al. |
| 2003/0029728 A1 | 2/2003 | Scharifker et al. |
| 2003/0165413 A1 | 9/2003 | Scharifker et al. |

FOREIGN PATENT DOCUMENTS

| | | |
|---|---|---|
| AU | 641593 | 9/1993 |
| JP | 52-30775 | 3/1977 |

OTHER PUBLICATIONS

"A biaxial nematic gel phase in aqueous vanadium pentoxide suspensions," the European Physical Journal B, O.Pelletier et al., 12, (1999), Societa Italiana di Fisica, pp. 541-546.
"Redox Chemistry of $H_2S$ oxidation by the British Gas Stretford Process, Part IV: V-S-H20 Thermodynamics and aqueous vanadium (v) reduction in alkaline solutions," Journal of Applied Electrochemistry, G.H. Keslsall et al., 23, (1993), Chapman & Hall, pp. 417-426.
"Microporous Vanadium Pentaoxide. 2. Making Solids from Colloidal Microemulsions," Langmuir, Desai et al., 14, (1998), American Chemical Society, pp. 277-282.
"Electro-Reductive stripping of vanadium in solvent extraction process for separation of vanadium and molybdenum," Journal of Chemical Engineering of Japan, Hirai et al., 24 No. 1, (1991), pp. 124-125.
"Reactivite Electrochimique de Quelques Oxydes de Vanadium en Milieu HC1 1 M," Electrochhimica Acta, Elouadseri et al., 31 No. 10, (1986), Pergamon Journal Ltd., pp. 1335-1339.
"Recovery of Vanadium and Nickel in Fly Ash from Heavy Oil," Journal of Chemical Technology & Biotechnology, 62, (1995), Akita et al., SCI, pp. 345-350.
"Electrochemically synthesized vanadium oxides as Lithium insertion hosts," Electrochimica Acta, E Potiron et al., 45 (1999), Elsevier Science Ltd., pp. 197-214.
"Catalytic determination of Ultra trace amounts of vanadium with detection by linear sweep voltammetry," Journal of Analytical Chemistry, Ensalfi et al., 358 (1997), Springer Verlag, pp. 480-483.
"Electrochemical behaviour of Vanadium compounds at a carbon paste electrode," Journal of Electroanalytical Chemistry, E. Barrado et al., 427 (1997), Elsevier Science S.A. pp. 35-42.
"Vanadium Recycling", Fusion Technology, T.J. Dolan et al., 26 (1994), pp. 1014-1019.
"Electrochemical quartz crystal microbalance study for vanadium hexacyanoferrates: Monitoring of film growth and ion effects during redox reactions," Journal of Electroanalytical Chemistry, Wang et al., 430 (1997), Elsevier Science, S.A, pp. 127-132.

(Continued)

*Primary Examiner*—Steven Bos
(74) *Attorney, Agent, or Firm*—Peter Brunovskis; Brinks Hofer Gilson & Lione

(57) ABSTRACT

A chemical process that recovers the vanadium contained in inorganic acid solutions, precipitating it as a solid compound of vanadium and alkali metal or monovalent cation ferrocyanide, is disclosed. Separation is carried out electrochemically, depositing the compound onto a metal immersed in the acid solution that contains vanadium as well as other dissolved metals, to which a ferrocyanide salt of an alkali metal or a monovalent cation has been previously added. If the inorganic acid present in solution is different than nitric acid, the vanadium can also be separated by direct addition of a ferrocyanide salt of an alkali metal or a monovalent cation to the acid solution containing vanadium. The method described allows recovery of vanadium without modifying the initial composition of the solution, except for the concentration of the vanadium dissolved.

7 Claims, No Drawings

OTHER PUBLICATIONS

"Synthesis and Properties of Two Series of Heavy Metal Hexacyanoferrates," Journal of Inorganic Nuclear Chemistry, 33 (1971), Ayers et al., Pergamon Press, pp. 721-733.

"Synthesis and Properties of a Series of Pentacyanoferrates" Journal of Inorganic Nuclear Chemistry, 31, (1969), Ayers et al., Pergamon Press, pp. 2045-2051.

"Researches on Chemically Modified Electrodes, Part XVI Electron Diffusion Coefficient in Vanadium Hexacyanoferrate film" Journal Electroanalytical Chemistry, 217 (1987), Shaojun et al., Elsevier Sequoia, S.A., pp. 49-63.

"Developments of biosensors based on Hexacyanoferrates," Talanta. 52 (2000), Luiz de Mattos et al., Elsevier Science B.V., pp. 791-799.

PROCESS TO SEPARATE THE VANADIUM CONTAINED IN INORGANIC ACID SOLUTIONS

RELATED APPLICATIONS

This application is a divisional application of U.S. Ser. No. 10/198,652 filed on Jul. 18, 2002, now abandoned which claims the benefit of priority of Venezuelan patent application Serial No. VE 200101538, filed on Jul. 18, 2001, the entire contents of which are incorporated herein by reference.

BACKGROUND

A method to separate dissolved vanadium in acid solutions is presented here. These solutions or liquors may be produced, for example, during treatments for the demetallization of carbonaceous materials, such as fractions of heavy crude oils, or from residues obtained during oil refining processes, for example petroleum coke. The typical vanadium content in these liquors usually exceeds 4%, thus representing a significant source of this metal. These solutions usually contain other metals such as nickel, in concentrations around 0.1%, as well as iron, although in lesser quantities.

The recovery of vanadium from these solutions is of interest because of the diverse industrial applications of this metal, such as for catalysts in oil refining processes, the manufacture of ferrous alloys (steels), and the construction of batteries.

Processes reported in the literature for the recovery of dissolved vanadium from inorganic acid solutions involve essentially precipitation with complexing agents such as ammonia to obtain ammonium metavanadate.

These procedures generally require adjustment of the solution pH from its initial value, usually between zero and one, to a value close to two. The latter implies partial neutralization of the original acid content, meaning that the neutralized solution must be thrown away, which is not desirable.

If the acid concentration can be maintained during recovery of the metal, as with the methodology presented here, then the liquor can be used again in the initial process of demetallization. In this way, the cost associated with the overall process is reduced, and the production of waste materials that may involve environmental hazard is also reduced.

The process described here allows recovery of vanadium from solution, whatever its oxidation state, without changing the initial composition of the solution, except for the vanadium content, which decreases by about 99%. In this way, it is possible to reuse the liquor for the demetallization of carbanaceous materials, as mentioned in the previous paragraph, which provides advantages over techniques hitherto proposed in the literature.

In the process mentioned here, the recovery is carried out in a single step, and results in a ferrocyanide compound of vanadium and monovalent cation, which has practical applications in electronic devices, such as electrochromic screens. In procedures appearing in the literature, the compound formed to precipitate dissolved vanadium is ammonium metavanadate. This requires an additional step to transform it into vanadium pentoxide; this compound has known practical application and considerable commercial value. Conversion is attained heating the ammonium metavanadate in air at a temperature higher than 650 degrees Celsius.

BRIEF SUMMARY

The invention refers to a chemical process that recovers the vanadium contained in inorganic acid solutions, precipitating it as a solid compound of vanadium and alkali metal or monovalent cation ferrocyanide. Separation is carried out electrochemically by depositing the compound onto a metal immersed in the acid solution that contains vanadium as well as other dissolved metals, to which a ferrocyanide salt of an alkali metal or a monovalent cation has been previously added. If the inorganic acid present in solution is different than nitric acid, the vanadium can also be separated by direct addition of a ferrocyanide salt of an alkali metal or a monovalent cation to the acid solution containing vanadium. The method described allows recovery of vanadium without modifying the initial composition of the solution, except for the concentration of the vanadium dissolved.

DESCRIPTION OF THE INVENTION

The procedure involves initially adding to the acid solution that contains the dissolved vanadium a ferricyanide salt (hexacyanoferrate (III)) of a metal of the alkali group in the periodic table, like lithium, sodium, potassium, etc., or any other monovalent cation, i.e. with a single positive charge, for example $NH_4^+$. The acid solutions or liquors can originate, for example, from demetallization treatments of carbonaceous materials, like crude oil, fractions of heavy crude oil, residues obtained from oil refining processes (e.g. crude oil, petroleum coke) or residues from processing fractions of crude oil, cokes, mineral carbons or bitumen sands. The acid solution or liquor that contains the vanadium may be composed of any of the following acids: sulfuric, nitric, perchloric, hydrochloric, phosphoric, hydrofluoric, or mixtures thereof. They may be either concentrated or dilute solutions of the acids, as well as concentrated or dilute with respect to vanadium.

The amount of salt that is necessary to add is estimated from the approximate concentration of vanadium to be recovered in the original solution. This should be at least two moles of iron in the added salt for each three moles of dissolved vanadium to be recovered from solution. An excess of the iron compound may be added.

Hereafter, a piece of conducting material, which may be metal or carbon, is immersed in the solution. Then a constant cathodic current density higher than $0.52$ mA/cm$^2$ is applied.

It is also possible to conduct the electrodeposition applying a constant potential more negative than $0.85$ V with respect to the saturated calomel electrode. The charge needed for electrodeposition of all the dissolved material is determined from the vanadium concentration present in the solution or liquor and to be recovered, considering that is necessary to pass approximately $36.81$ C/cm$^2$ for each gram of vanadium recovered as deposit.

Deposition initially occurs on the metallic surface contacting the aqueous solution. When the surface has been totally covered, then the compound continues to deposit on to the adhered material, and eventually the excess solid detaches from the metallic piece and disperses as a powder in the solution. Once the passing of the estimated charge for recovery of vanadium in solution has been completed, the resulting solid compound suspended in the solution is then separated using a physical method, consisting of filtration, centrifugation, etc. Because of its low adherence, the material deposited on the conducting material is recovered by soft scraping of the surface. With this procedure, 99% of the vanadium in solution can be separated without any interference from other dissolved materials.

A particular case occurs when sulfuric acid is the sole inorganic acid present in solution or liquor. In this case, the dissolved vanadium can also be recovered chemically, i.e., without applying any electrical charge, in the form of vanadyl and alkali metal or monovalent cation ferrocyanide. To accomplish this, a known quantity of ferrocyanide salt (hexacyanoferrate (II)) of alkali metal or monovalent cation is added to the liquor that contains the dissolved vanadium in sulfuric acid, instead of the ferricyanide salt (hexacyanoferrate (III)) of alkali metal or monovalent cation, as required by the electrodeposition procedure. The iron salt in which this element exhibits its lower oxidation state is therefore directly added to the acid solution or liquor.

A precipitate is immediately formed with addition of the iron (II) salt to the vanadium-containing solution, when sulfuric is the only mineral acid present. The composition of this solid corresponds to vanadyl and alkali metal or monovalent cation ferrocyanide. Therefore, chemical separation of the dissolved vanadium can be carried out without passing electrical charges through solution. When inorganic acids other than sulfuric are dissolved in vanadium-containing solutions or liquors, for example nitric acid, the ferrocyanide salt of the alkali metal or monovalent cation decomposes with the acid and the formation of a vanadyl complex becomes impossible. In this case, separation of vanadium from solution is only possible with application of electric charges as previously described.

EXAMPLE 1

The vanadium dissolved in 150 ml of a solution containing 0.01 M vanadium pentoxide (0.1% dissolved vanadium), 0.013 M potassium ferricyanide (0.43% potassium ferricyanide) and 3.6 M sulfuric acid (35% sulfuric acid), was recovered passing electric charge through two platinum mesh electrodes of 86 cm$^2$ each.

A mixing rod was used to improve mass transport to the platinum mesh surfaces in order to increase the electrodeposition efficiency. An electric current of 10 mA was applied for 3.1 hours for a charge density of 3.8 C/cm$^2$. When the electrochemical experiment was completed, the solution was filtered in order to collect the suspended solid, which was subsequently dried and weighed. The weight gain of the platinum mesh cathode, where electrodeposition of a green compound occurred, was also determined. The sum of both quantities, the filtered solid and the deposited compound, which corresponds to the total quantity of compound formed, was 0.85 g, of which 0.14 g corresponded to vanadium.

In the experiment described above, the quantity of vanadium initially present in solution was 0.15 g; thus the percentage of recovered vanadium was estimated relating the quantity of recovered metal to that initially contained in solution. In this sulfuric acid solution containing vanadium, the percentage of vanadium recovered was 93%.

In an experiment otherwise identical to that described above, except for longer electrodeposition time, with passage of 20 C/cm$^2$ of electrical charge, 0.89 g of compound were obtained. This corresponds to 0.15 g of vanadium in the solid obtained, for essentially 100% of recovery of the vanadium contained in solution.

EXAMPLE 2

Vanadyl and potassium ferrocyanide was synthesized mixing equal volumes of an aqueous solution of 0.02 M vanadium pentoxide (0.20% of dissolved vanadium) and 3.6 M sulfuric acid (35% of sulfuric acid), with another solution containing 0.026 M potassium ferrocyanide (0.96% ferricyanide) and 3.6 M sulfuric acid. Precipitation of the vanadyl and potassium ferrocyanide compound occurred instantaneously when both solutions came in contact. The solid formed was filtered, dried and weighted, and its composition was determined dissolving a known quantity of the solid in a concentrated inorganic acid, analyzing the elemental composition of this solution using Inductively Coupled Plasma (ICP) spectroscopy. The results indicated that the compound corresponds to the molecular formula $K_2(VO)_3[Fe(CN)_6]_2 15H_2O$. The resulting yield of this reaction was of 98%; thus, 98% of the vanadium initially dissolved in solution was successfully recovered.

Other systems, methods, features and advantages of the invention will be, or will become, apparent to one with skill in the art upon examination of the following figures and detailed description. It is intended that all such additional systems, methods, features and advantages be included within this description, be within the scope of the application, and be protected by the following claims.

The invention claimed is:

1. A process for recovering vanadium from a solution or liquor comprising sulfuric acid, comprising:
   a. adding a hexacyanoferrate (II) salt of an alkali metal or monovalent cation to the solution or liquor in an amount based on the quantity of vanadium to be recovered, thereby forming a precipitate;
   b. separating the precipitate from the solution or liquor by a physical separation method.

2. The process of claim 1 wherein the amount of hexacyanoferrate (II) salt added to the solution or liquor is determined such that at least two moles of iron are present per three moles of vanadium in the solution or liquor.

3. The process of claim 2 wherein iron is added in an excess amount.

4. The process of claim 1 wherein the inorganic acid solution or liquor is derived from a carbonaceous material.

5. The process of claim 4 wherein the carbonaceous material is crude oil, fractions of crude oil, residues from processing crude oil, residues from processing fractions of crude oil, cokes, mineral carbons, or bitumen sands.

6. The process of claim 1 wherein the solution or liquor is concentrated.

7. The process of claim 1 wherein the solution or liquor is dilute.

* * * * *